No. 813,703. PATENTED FEB. 27, 1906.
W. HULLERMAN.
SHAFT AND POLE COUPLING FOR VEHICLES.
APPLICATION FILED AUG. 18, 1905.
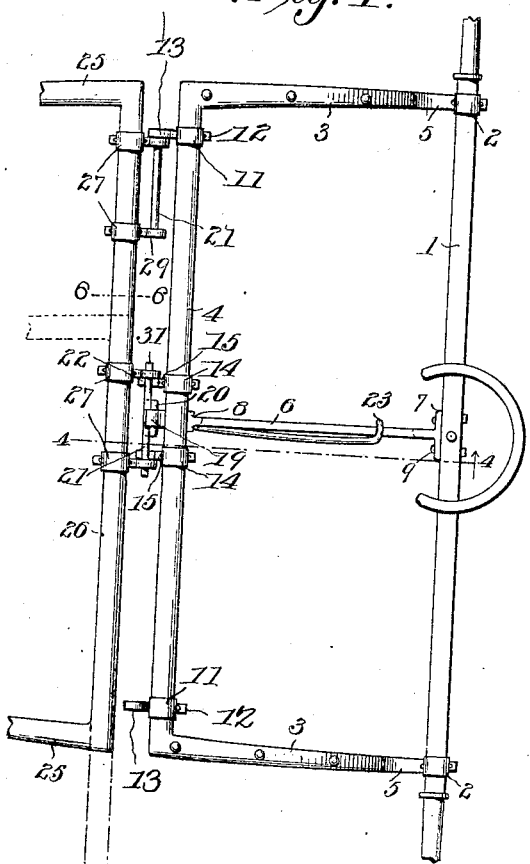
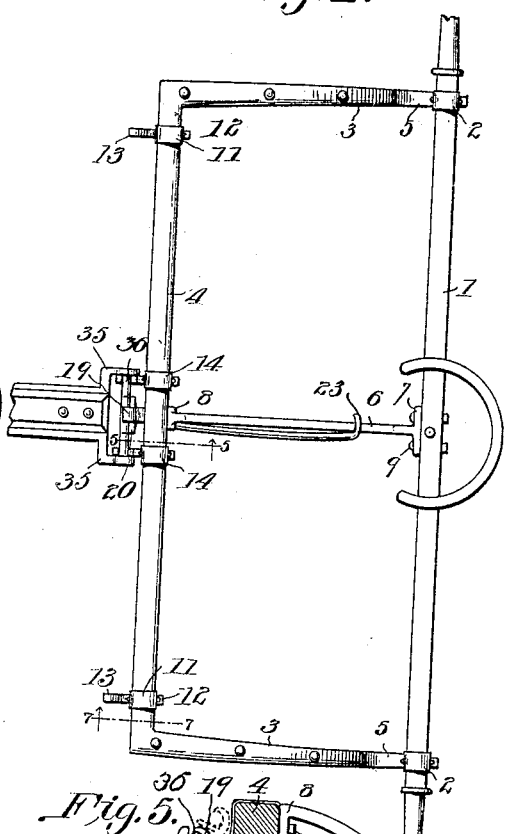
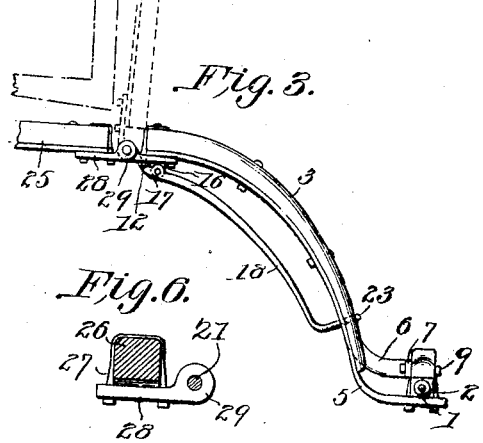
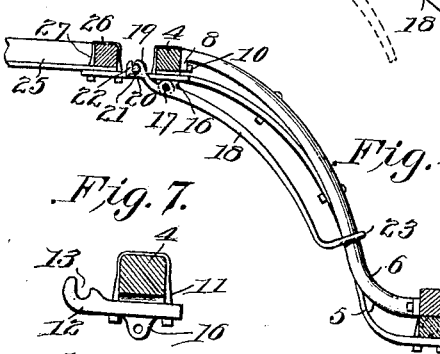
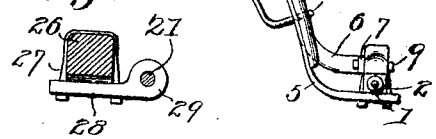
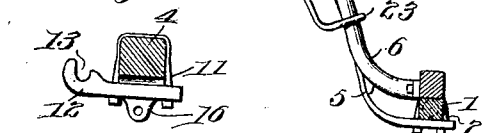
Witnesses
William Hullerman,
Inventor.
by C. A. Snow & Co.
Attorneys

UNITED STATES PATENT OFFICE.

WILLIAM HULLERMAN, OF INDEPENDENCE, IOWA.

SHAFT AND POLE COUPLING FOR VEHICLES.

No. 813,703.  Specification of Letters Patent.  Patented Feb. 27, 1906.

Application filed August 18, 1905. Serial No. 274,757.

*To all whom it may concern:*

Be it known that I, WILLIAM HULLERMAN, a citizen of the United States, residing at Independence, in the county of Buchanan and State of Iowa, have invented a new and useful Shaft and Pole Coupling for Vehicles, of which the following is a specification.

This invention relates to shaft and pole couplings for vehicles; and among the objects of the invention are to promote simplicity, durability and general efficiency of this class of devices.

Another object of the invention is to provide an improved construction which will admit of shafts and pole being easily and quickly interchanged when desired.

Still another object of the invention is to provide for the quick and ready detachment of either shafts or pole from the running-gear, thus providing for the detachment of the draft-animals in case of runaway or accident.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a plan view showing a portion of a running-gear having shafts connected therewith by the improved device which constitutes the invention. Fig. 2 is a similar view, but showing a pole substituted for the shafts. Fig. 3 is an end view of the device shown in Fig. 1. Fig. 4 is a sectional view taken on the plane indicated on the line 4 4 in Fig. 1. Fig. 5 is a sectional detail view, enlarged, taken on the line 5 5 in Fig. 2. Fig. 6 is a sectional detail view taken on the line 6 6 in Fig. 1. Fig. 7 is a sectional detail view taken on the line 7 7 in Fig. 2.

Corresponding parts in the several figures are indicated throughout by similar characters of reference.

Suitably connected with a front axle 1, as by means of clips 2 2, is a hound-frame which includes arched end members 3 3, connected with each other by a straight front member 4, said frame, and especially the arched side members thereof, being liberally shod with reinforcing-straps 5, of iron or steel, in order that it may be very securely and permanently connected with the front axle.

The front member 4 of the hound-frame is connected with the axle 1 by means of a reinforcing-brace 6, which is provided at the ends thereof with reinforcing-lugs or flanges 7 and 8 for the passage of bolts 9 and 10, whereby it is secured, respectively, to the front axle and to the member 4 of the hound-frame. The brace 6 is bent or curved approximately in the planes of the curved end members 3 of the hound-frame. Said front member 4 is provided near the ends thereof with clips 11, including plates 12, which are extended forwardly of the hound member and which are provided with eyes 13 for the reception of connecting bolts or members, which are presently to be described.

Near the middle of the hound member 4 and adjacent to the sides of the intermediate brace 6 are clips 14, including plates 15, having downward-extending lugs 16, which are connected by a pin or bolt 17, upon which is mounted a resilient lever 18. The said lever terminates at one end in a hook member 19 and a supporting-plate 20, which are spaced sufficiently for the admission of a coupling member, consisting of a pin 21, which by manipulating said lever may be forced into engagement with hooks 22 at the forward ends of the clip-plates, as will be best seen in Fig. 5 of the drawings, the coupling pin or member being retained securely in position by simply hooking the free end of the lever 18, which terminates in a hook 23 over the brace 6. By disengaging the hook member and depressing the free end of the lever, the supporting-plate 20 will positively force the coupling member 21 out of engagement with the hooks 22, thus separating the parts which were coupled together.

In Fig. 1 of the drawings has been shown the rear ends of a pair of shafts 25, which are connected by a cross-bar 26. These shafts are adapted to be connected with the hound-frame, which is permanently connected with the front axle, and said shafts may consequently be practically straight throughout instead of being downturned at their rear ends, as is customary with devices of this kind. The cross-bar 26 is provided with pairs of clips 27, one pair of said clips being located near the middle and one pair near one end of the cross-bar. The clips 27, which include the clip-plates 28, provided at their rear ends with eyes 29, are connected in pairs by means of the pins or connecting members 21, said connecting-pins being preferably extended at their outer ends, as will be seen at 31, for engagement with the hooks 22 of the clip-plates 15 and also with the eyes 13, formed at the front ends of the clip-plates 12, which are mounted upon the front member 4 of the hound-frame near the ends of said front member.

When shafts are to be coupled to the hound-frame, the first requisite is to release the lever 18 from engagement with the brace 6. The coupling-pins 21 are now placed adjacent to the respective clips with which they are to coöperate, the central pin 21 being engaged with the hook 21 of the lever 18 in such a manner as to rest upon the supporting-plate 20. By raising the free end of the lever the coupling-pin will be forced into the receiving hooks or boxes and will be securely retained as long as the hooked end of the lever 18 is in engagement with the brace 6. This engagement may be readily effected at any time by unhooking the free end of the lever 18, which latter has sufficient inherent resiliency to permit it to be thus manipulated.

It will be readily seen that if side draft is desired the shafts may be moved to one side of the longitudinal center, as indicated in dotted lines in Fig. 1 of the drawings. This is frequently desirable in order to save the draft-animal from walking between the ruts.

When a pole is substituted for a shaft, it is not necessary to provide said pole with hounds, such as are usually employed for direct attachment to the front axle; but said pole is simply provided at its rear end with a pair of lugs 35, connected by a coupling-pin 36, adapted to engage the coupling-lever 18 and related parts, to be thereby connected securely with the central portion of the front member of the hound-frame.

From the foregoing description, taken in connection with the drawings hereto annexed, the operation and advantages of this invention will be readily understood by those skilled in the art to which it appertains. The general construction is simple and inexpensive. The device may be easily applied to vehicles of ordinary construction without any special preparation, and vehicles equipped with the invention may readily be used either with shafts or with a tongue, the said members being easily and quickly interchangeable.

An important and valuable feature of the invention resides in the fact that in the event of runaway or accident the driver by simply reaching over the dashboard of the vehicle may readily release the lever 18, thus positively separating the connected parts and detaching the draft-animals.

Having thus described the invention, what is claimed is—

1. A hound-frame including a straight front member and end members connecting said front member with and supporting it above the horizontal plane of a vehicle-axle, an auxiliary intermediate brace connecting said front member with the axle, clip-plates connected with the front member and having terminal hooks at their front ends, and a resilient lever having a terminal front hook and supporting-plate and a terminal rear hook adapted to engage the auxiliary brace.

2. A hound-frame having clip-plates provided with terminal hooks, a draft element having clip members provided with hook-engaging pins, a securing member consisting of a suitably-supported resilient lever having a pin-engaging hook, and means for securing the free end of the lever in locked position.

3. A hound-frame having clip-plates provided with terminal hooks, a locking-lever associated with said clip-plates and having a terminal front hook and a supporting-plate, a draft element having suitably-supported hook-engaging pins one of said pins being adapted for engagement with the locking-lever between the hook and the supporting-plate of the latter, and means for securing the locking-lever in operative position.

4. A hound-frame having a straight front member provided with a plurality of clip members including plates having front terminal hooks and eyes, a draft element having a plurality of supporting members, pins supported by said members and adapted for interchangeable engagement with the hooks and eyes supported by the front hound member, and means for effecting a locking engagement between said pins and hooks.

5. A hound-frame including a front member supported above and in front of a vehicle-axle, clip-plates connected with said front member and having front terminal hooks, a draft element having a supported pin for engagement with said front terminal hooks, a lever having a pin-engaging end including a hook and a supporting-plate, the latter constituting an ejector, and means for securing said lever in engaging position.

In testimony that I claim the foregoing as my own I have hereto affixed my signature in the presence of two witnesses.

WILLIAM HULLERMAN.

Witnesses:
 M. A. SMITH,
 CHAS. L. KING.